United States Patent [19]

Yates et al.

[11] 3,857,681

[45] Dec. 31, 1974

[54] COPPER FOIL TREATMENT AND PRODUCTS PRODUCED THEREFROM

[75] Inventors: Charles B. Yates; Adam M. Wolski, both of Edgewater Park, N.J.

[73] Assignee: Yates Industries, Inc., Bordentown, N.J.

[22] Filed: Jan. 5, 1972

[21] Appl. No.: 215,648

Related U.S. Application Data

[63] Continuation-in-part of Ser. No. 168,755, Aug. 3, 1971, abandoned.

[52] U.S. Cl...................... 29/195, 29/199, 156/151, 204/27, 204/37 R, 204/35, 204/38 S, 204/40, 204/41, 204/52 R, 204/55 R

[51] Int. Cl........ B23p 3/00, C23b 5/50, C23b 5/52

[58] Field of Search......... 29/199, 195 P; 204/37 R, 204/38 S, 38 E, 40, 35, 41, 27; 156/151

[56] References Cited

UNITED STATES PATENTS

| | | | |
|---|---|---|---|
| 2,115,749 | 5/1938 | Rubin | 204/8 |
| 2,392,456 | 1/1946 | Brown et al. | 204/37 R |
| 2,402,384 | 6/1946 | Nachtman | 204/37 R |
| 2,428,033 | 9/1947 | Nachtman | 204/37 R |
| 2,802,897 | 8/1957 | Hurd et al. | 204/38 E X |
| 3,220,897 | 11/1965 | Conley et al. | 204/52 R X |
| 3,293,109 | 12/1966 | Luce et al. | 204/52 R X |
| 3,322,656 | 5/1967 | Dahringer et al. | 204/38 E |
| 3,328,275 | 6/1967 | Waterbury | 204/38 E |
| 3,377,259 | 4/1968 | Phillips | 204/20 |
| 3,585,010 | 6/1971 | Luce et al. | 204/55 R X |

*Primary Examiner*—G. L. Kaplan
*Attorney, Agent, or Firm*—Lane, Aitken, Dunner & Ziems

[57] ABSTRACT

Copper foil is subjected to a plurality of copper layer treatments including a roughening treatment followed by a locking or gilding treatment so as to form a matte surface on the copper foil. The matte surface is then coated with a thin layer of zinc and heated to produce a brass layer which provides the copper foil with good bond strength with respect to a supporting substrate, and without laminate staining or discoloration. Other metals may also be used in lieu of zinc.

29 Claims, No Drawings

COPPER FOIL TREATMENT AND PRODUCTS PRODUCED THEREFROM

CROSS-REFERENCES TO RELATED APPLICATIONS

This application is a continuation-in-part of applicant's copending U.S. application entitled "Copper Foil Treatment and Products Produced Therefrom" filed Aug. 3, 1971 under Ser. No. 168,755, now abandoned.

BACKGROUND OF THE INVENTION

In the production of printed electronic circuits, it is a common practice to bond metal foil to a substrate material, generally a synthetic polymer, with an adhesive and to subject the composite structure to an acid etching treatment to form the desired circuit. Because the adhesion between conventional metal foil and such a substrate material is normally weak, considerable effort has been directed in the past to treating the foil so as to increase its bond strength with the substrate. As a result of such efforts, treatments have been developed which result in the formation of a matte surface on at least one side of copper foil by electrodepositing a dentritic copper electrodeposit on its surface so that when coated with a hardenable plastic material the treated surface will, in effect, grip the plastic and form a tenacious bond.

While techniques such as the foregoing have succeeded in improving bond strength to some degree, problems have arisen in connection with the lamination of such treated foil to plastic substrates. More specifically, copper foil which has been provided with a "copper-type" treatment of the foregoing type tends to leave, after having been etched to form the desired printed circuit, traces of solid residue on the surface of the exposed plastic substrate. This residue is referred to in the trade as laminate staining or discoloration and is a highly undesirable effect. This laminate staining takes place likely because the matte (treated) side of the foil is subjected during the laminating process to contact with semi-liquid resin. Chemical reactions apparently take place between the copper and the resin components producing products which are not readily soluble in etching solutions used in printed circuit applications and which, accordingly, remain on the laminate surface, causing staining.

SUMMARY OF THE INVENTION

In accordance with the present invention, the above-indicated problems are resolved by treating the copper foil so as to produce a matte surface formed of a plurality of copper electrodeposits having certain defined characteristics and coating the matte surface with a thin layer of zinc which, when heated, will form a brassy layer with the underlying copper. Such layer provides the treated foil with high bond strength and renders the laminate made from it etchable in a single bath to produce the desired printed circuit with acceptable laminate color characteristics.

Accordingly, it is an object of the present invention to provide a novel method and articles made therefrom for improving the bond strength between the matte surface of copper foil and an underlying substrate so as to provide a laminate suitable for printed circuit applications which is not subject to laminate staining or discoloration.

This and other objects and advantages of the present invention will become more apparent in connection with the ensuing description and appended claims.

DETAILED DESCRIPTION OF THE PREFERRED EMBODIMENTS

In accordance with the present invention copper foil is first subjected to a treatment which will effectively serve to roughen at least one of its surfaces and to leave such surface with a matte finish the bonding characteristics of which are enhanced over the untreated foil. In order to achieve the desired results of this invention, this initial treatment of the copper foil is important. It has been found that the desired characteristics will be achieved if the copper foil is subjected to a treatment which comprises the application to the foil of at least two separate electrodeposited copper treatment layers, each succeeding electrodeposited layer having a different mechanical structure from a preceding electrodeposited layer to present a treated surface having physical properties different from those of the latter. In other words, this treatment involves a plurality of electrolytic copper treating operations carried out in a plurality of treating tanks, each one being carried out under separate electroplating conditions. The first treatment involves the application to the copper foil of a nodular powdery electrodeposited copper layer which is coarse and rough and weakly adherent to the base copper foil, followed by a second treatment involving the application of an electrodeposited locking or gilding copper layer which is not nodular in structure but which conforms to the configuration of the first layer.

The first treatment layer is supplied to increase the bond strength of the copper foil so that it can be more advantageously bonded to a substrate to form a laminate for use in electronic printed circuits. This first treatment step is capable of increasing the bond strength of 1 oz. foil to range from 10 to 11 lbs./in. of width of laminate, depending upon the particular conditions utilized in this first treatment step. The amount of copper deposited in this first layer should be about 3–5 and preferably about 4 gms./$m^2$ of foil.

The second treatment step, that is, the application of the "locking" or "gilding" copper layer, does not reduce the bond strength supplied by the initial copper layer treatment, and ordinarily will increase such bond strength to about 12–13 lbs./in. of width of laminate. It does, however, reduce or eliminate the disadvantageous powder transfer characteristics which the foil otherwise would have as a result of the first treatment stage. The layer deposited in this second treatment stage should have a thickness such that this layer causes substantially no decrease in bond strength. For best results, the amount of copper deposited in this second step to achieve this goal should be about 3–7 and preferably about 5 gms./$m.^2$ of foil.

Table 1 below shows the usable ranges of conditions as well as the preferred conditions for use in this phase of the invention.

Table I

| Condition | Nodular Layer | Locking Layer |
|---|---|---|
| Cathode current density (amps./$ft.^2$) | 150–300; 200 preferred | 100–300; 200 preferred |
| Temperature (°F.) | 80–110; 90 preferred | 120–160; 120 preferred |

Table I-Continued

| Condition | Nodular Layer | Locking Layer |
|---|---|---|
| Copper concentration (gms./liter, calculated as Cu) | 20–30; 20 preferred | 50–100; 70 preferred |
| Acid concentration (gms./liter, calculated as $H_2SO_4$) | 50–100; 75 preferred | 50–100; 75 preferred |
| Circulation for device holding electrolyte (liters/min.) | 0–100; 20 preferred | 0–100; 20 preferred |
| Voltage | 7–8; 7.5 preferred | 5–7; 6 preferred |
| Time (sec.) | 10–14; 12 preferred | 8–12; 12 preferred |
| Cathode | copper foil | copper foil |
| Anode | insoluble lead | insoluble lead |

The above process is preferably carried out in two separate treatment tanks as a series operation. In other words, the foil is treated in the first tank and thereafter treated in the second tank. Alternatively, but less preferred, both treatments can be carried out in the same tank with the draining of the tank between treatments.

One oz. foil processed in accordance with the conditions of the above table will possess a bond strength of about 12–13 lbs./in. and at the same time does not have the powder transfer problem of corresponding foil which has not been subjected to the locking or gilding layer treatment.

The particular apparatus employed to apply each of the layers to the surfaces of the copper foil forms no part of the present invention. Such layers can, however, be conveniently applied by passing the copper foil through an electrolyte in the manner and using apparatus such as is disclosed in the application of Charles E. Yates, Ser. No. 421,048, filed Dec. 24, 1964 and which is now abandoned. Such apparatus involves the use of plate anodes with the copper coil passed in serpentine fashion in proximity to such anodes and, by appropriate contact between the copper foil and conducting rollers, the copper foil is made cathodic in the circuit. By passing the copper foil through such a system so that the surface of the foil to be coated faces the active face of the anodes, the metal to be coated on said surface will be electrodeposited thereon from the electrolyte. As will be appreciated, in order to carry out the preferred arrangement, the apparatus used will employ two separate treatment tanks.

After the matte surface has been deposited on the copper foil it is coated with a thin layer of zinc. However, before applying the zinc layer to the treated surface it is important that the treated surface be thoroughly washed so as to completely remove any residue of sulfuric acid therefrom which would otherwise prevent the zinc from plating properly. This may be accomplished in any convenient manner but the use of a series of water washes is preferred. While the amount of washing will vary depending on the roughness of the matte surface, excellent results can be obtained by directing alternating, serially arranged, hot (130°F.) and cold (room temperature) sprays at the matte surface utilizing a total water volume of about 20 gals./min. The treated and washed copper foil is then passed through a plating bath and a layer of zinc is electrodeposited on the matte surface of the copper foil so as to completely cover said surface. The zinc will be deposited in a layer of 0.3–3 and preferably 1 gms./m.$^2$ of foil surface. Any of the conventional means for electroplating zinc may be employed in this phase of the invention although an apparatus of the type disclosed in the aforementioned application is preferred. Alternatively, though less effective, other methods of application of the metal coating may be employed such as vapor deposition.

In the preferred embodiment, the treated copper foil will be passed through a plating bath under the usable ranges of conditions set forth in Table 2 below.

Table 2

| Condition | Broadest Range of Conditions | Preferred Conditions |
|---|---|---|
| $ZnSO_4.7H_2O$ (g/l) | 5–400 | 80–300 |
| $(NH_4)_2SO_4$ (g/l) | 0–250 | 0–50 |
| Water | balance | balance |
| Cathode Current Density (ASF) | 5–300 | 10–20 |
| Immersion Time (Sec.) | 5–60 | 5–30 |
| Electrolyte Temperature (°F.) | 50–150 | 80–90 |
| Cathode | copper foil | copper foil |
| Anode | insoluble lead; lead-antimony (8%); soluble zinc | copper foil |

The ammonium sulfate [$(NH_4)_2SO_4$], indicated above, is used as a buffer to bring the bath solution to a pH between about 1.5 to 6, preferably to a pH of 3.5.

In lieu of a zinc sulfate solution, zinc fluoborate can be used. Similarly, a zincate bath of zinc sulfate plus sodium hydroxide can be employed.

Following deposition of the zinc layer on the copper matte surface the multi-layer foil is subjected to heating at a temperature between 250° to 400° F., preferably 400° F., for a period of time within the range of about 30 minutes to about 10 hours, preferably 30 minutes. This heating operation may be accomplished in any conventional manner but in the preferred embodiment the foil is wound on a steel core and placed in an oven containing an inert atmosphere (e.g., argon) which has been heated to an appropriate temperature. The heating of the foil may be effected immediately after the application of the zinc layer or it may be deferred until a time prior to bonding the foil to an appropriate substrate. Prior to heating the coated surface, the foil will exhibit a blue-gray color, obviously the color of the zinc layer. However, after heating the treated surface of the foil will take on a yellowish or gold color which indicates that the zinc has alloyed itself with the underlying copper to form a brass layer.

If the treated foil is subjected to temperatures in excess of that indicated above, the shiny side of the foil may oxidize. In addition such higher temperatures may cause recrystalization of the copper resulting in a loss of properties such as hardness, ductility, etc., which are important to printed circuit applications.

Since the zinc and copper layers are both soluble in the same type of acid etchant bath (though, as noted below, to different degrees), etching of the foil when bonded to an appropriate substrate may be accomplished without the unnecessary expense of utilizing an etchant for the coating metal and a separate etchant bath for the underlying copper matte surface. Furthermore, the resultant etched laminate will not be accompanied by laminate staining or discoloration. This improvement is made possible since zinc does not react with resins ordinarily used in printing circuitry. Since, in addition, zinc is more readily soluble than copper in conventional etching solutions, the laminate of the present invention provides improved etching and produces clean printed circuit products.

As previously mentioned, it is within the contemplation of the present invention not only to provide a novel method for producing copper foil having good bond strength and not subject to laminate staining in printed circuit applications and copper foil produced thereby but to provide laminates comprised of said copper foil bonded to an appropriate substrate. As will be apparent, the particular substrate used in this laminate will vary depending upon the use for which the laminate is intended and the service conditions under which such laminate will be used. Particularly appropriate substrates which adapt the laminate for use in forming printed circuits include non-flexible supports such as Teflon-impregnated fiberglass ("Teflon" is the trademark for polytetrafluoroethylene), Kel-F impregnated fiberglass ("Kel-F" is a trademark for certain fluorocarbon products including polymers of trifluorochloroethylene and certain copolymers) and the like. Flexible substrates include polyimides such as those known under the designations "Kapton" and "H-Film" (both are manufactured by duPont and are polyimide resins produced by condensing a pyromellitic anhydride with an aromatic diamine).

The adhesives used to bond the treated copper foil to the substrate are those conventionally used for the specific application in question, "FEP" (a fluorinated ethylene propylene resin in the form of a copolymer of tetrafluoroethylene and hexafluoropropylene having properties similar to Teflon) being particularly appropriate for the Teflon and Kel-F and conventional epoxy resins being useful for the other materials. The method of bonding the copper foil to the substrate is conventional and forms no part of the present invention, typical details of such bonding being set forth for example in the U.S. Pat. No. 3,328,275 to Waterbury.

The following examples further illustrate preferred operations within the scope of the present invention.

EXAMPLE 1

In this example, copper layers are applied to foil in an electroylic cell of the general type described in the previously referred to Yates patent application.

A roll of 1 oz. copper foil is electrodeposited with a nodular copper layer in a first treatment tank utilizing the following conditions:

| | |
|---|---|
| Cathode current density (amps./ft.$^2$) | 200 |
| Temperature (°F.) | 90 |
| Copper concentration (gms./liter, calculated as Cu) | 20 |
| Acid concentration (gms./liter, calculated as $H_2SO_4$) | 75 |
| Circulation (liter/min.) | 20 |
| Voltage | 7.5 |
| Time (sec.) | 12 |
| Cathode | copper foil |
| Anode | insoluble lead |

The copper foil so treated has on one of its surfaces a powdery nodular copper electrodeposit. As a result of this treatment step, the treated foil has a bond strength of about 10–11 lbs./in. This foil, however, has disadvantageous powder transfer characteristics in that when applied to a substrate to form a laminate, the laminate discolors when etched.

This roll of copper foil having been subjected to the nodular treatment then is treated in a second treatment tank to electrodeposit a gilding or locking copper layer over the previously applied nodular copper layer. This gliding or locking treatment is carried out utilizing the following conditions:

| | |
|---|---|
| Cathode current density (amps./ft.$^2$) | 200 |
| Temperature (°F.) | 120 |
| Copper concentration (gms./liter) | 70 |
| Acid concentration in terms of $H_2SO_4$ (gms./liter) | 75 |
| Circulation (liters/min.) | 20 |
| Voltage | 6 |
| Time (sec.) | 12 |
| Cathode | copper foil |
| Anode | insoluble lead |

The foil so treated has a bond strength of about 12–13 lbs./in. The resulting copper foil does not possess disadvantageous powder transfer characteristics.

EXAMPLE 2

The copper foil treated according to Example 1 is washed in a series of five water washes on its treated side. The washes are alternately hot and cold with the hot water being heated to a temperature of 130°F. and the cold water being at room temperature. The washed foil is then passed through an electrolyte containing zinc ions in an electrolytic cell of the type previously referred to in the aforementioned Yates application. The conditions under which the copper foil is treated are as follows:

| Conditions | |
|---|---|
| $ZnSO_4.7H_2O$ (g/l) | 240 |
| Water | balance |
| Cathode Current Density | 10 |
| Immersion time (sec.) | 10 |
| Electrolyte Temperature (°F.) | room temperature |
| Cathode | copper foil |
| Anode | insoluble lead (Pb 92% by weight; Sb 8%) |

The bond strength of the zinc coated foil is about 12–13 lbs./in.

At the conclusion of the treatment the zinc coated foil is wound on a stainless steel core and placed in an argon atmosphere in an oven having a temperature of 400°F. for 30 minutes. After heating the treated surface of the foil has a yellowish or "brassy" color.

In the foregoing description the application of a zinc coating to copper foil treated with a plurality of copper layers has been described as the preferred embodiment of the present invention. Alternatively, though not preferred, a brass layer may be applied directly over the second copper layer. In such case, however, the final, treated foil need not be subjected to a heat treatment since there is no necessity to form a brass layer through the alloying of the final zinc and underlying copper layers.

The brass layer is preferably applied electrolytically utilizing apparatus of the type previously described and a plating bath and conditions as described in Table 3 below.

Table 3

| Conditions | Broadest Range of Conditions | Preferred Condition |
|---|---|---|
| $Cu_2(CN)_2$ (g/l) | 10–200 | 30 |
| $Zn(CN)_2$ (g/l) | 1–100 | 9 |
| Water | balance | balance |
| NaCN or KCN (to serve as an ion provider to improve conductivity) (g/l) | 20–200 | 80 |
| $Na_2CO_3$ or $K_2CO_3$ (buffer) (g/l) | 0–200 | 60 |
| NaOH (g/l) | 0–100 | 0 |
| $(NH_4)_2SO_4$ (to influence color) (cc/liter) | 0–50 | 1 |
| Cathode current density (ASF) | 1–100 | 10 |
| Immersion time (secs.) | 5–50 | 20 |
| Electrolyte Temperature (°F.) | 50–100 | room temperature |
| Cathode | copper foil | copper foil |
| Anode | brass | brass |

In the foregoing brass plating process, the pH of the electrolyte will be about 10–13 and preferably 12.

Alternatively, the brass layer may be applied non-electrolytically. The thickness of the brass layer however applied, should be the same as that of the zinc layer.

In the addition to the foregoing, it is also within the contemplation of the present invention to provide an article in which, in lieu of depositing a zinc or brass layer atop the matte surface formed by the plurality of copper layer treatments, a layer of metal which is substantially chemically inert to the supporting substrate to which the foil is to be bonded in printed circuit applications so as to prevent laminate staining. Such metal should completely cover the matte surface and should be of a thickness such as to cause substantially no decrease in the bond strength of the matte surface at the time it is bonded to said substrate. Metals which can be employed in lieu of zinc or brass include, by way of example, nickel, cobalt, chromium, cadmium, tin and bronze. Each such metal may be electrodeposited in a conventional manner, preferably by electrodeposition, onto the plurality of copper layers which have previously been coated onto the base foil.

Of these substitute metals, nickel, cobalt, cadmium, tin and bronze are preferred.

When used in the specification and claims, the phrase "substantially no decrease in the bond strength of said matte surface" shall be construed to mean less than about 1 lb./in. in loss of bond strength.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A method of treating copper foil comprising applying to the foil at least two separate electrodeposited copper treatment layers to form a matte surface, the first such layer in contact with said foil comprising a nodular powdery copper electrodeposit which has been deposited from an acidic aqueous electrolyte separate from that used to form said copper foil, said electrolyte containing about 20–30 grams per liter of copper (calculated as Cu) at a cathode current density of about 150–300 amps./ft$^2$; the second such layer comprising a gilding layer which is not nodular in structure but which conforms to the configuration of the first layer so as to reduce the powder transfer characteristics of said first layer, said second layer having been deposited from an acidic aqueous electrolyte separate from that used to form said copper foil and said first layer, said electrolyte consisting essentially of about 50–100 grams per liter of copper (calculated as Cu) and sulfuric acid at a cathode current density of about 100–300 amps./ft$^2$; and coating said matte surface with a layer of zinc.

2. The method of claim 1 wherein said coated foil is heated following the application of said zinc coating so as to convert said zinc coating from a grayish to a yellowish color.

3. The method of claim 2 wherein said foil with said zinc coating is heated at a temperature from about 250° F. to about 400° F. for about 30 minutes to about 10 hours.

4. The method of claim 1 wherein the thickness of said zinc layer is such as to cause substantially no decrease in the initial bond strength of said matte surface.

5. The method of claim 1 wherein the application of the gilding layer causes substantially no decrease in bond strength supplied to the foil by the initial copper layer treatment.

6. The method of claim 1 wherein said coated foil is heated following the application of said zinc coating so as to cause said zinc layer to alloy with said copper matte surface to form, at least partially, a brass layer.

7. The method of claim 1 wherein the amount of zinc layer deposited is about 0.3–3 gms./m.$^2$ of foil.

8. The method of claim 1 wherein the amount of said first copper layer deposited is about 3–5 gms./m$^2$ of foil and the amount of said second copper layer deposited is about 3–7 gms./m$^2$ of foil.

9. The method of claim 1 wherein said treated foil is washed prior to the application of said zinc coating sufficiently to remove the acid residue therefrom.

10. The method of claim 1 wherein said zinc coating is electrodeposited on said matte surface.

11. The method of claim 1 wherein the zinc coating is applied utilizing electrodeposition conditions of cathode current density at about 5–300 amps./ft.$^2$, an electrolyte temperature of about 50°–150°F., a zinc concentration (calculated as $ZnSO_4 \cdot 7H_2O$) in the electrolyte of about 5–400 grams per liter, an electrodeposition time of about 5–60 seconds, the pH of said electrolyte being about 1.5–6.

12. The method of claim 1 wherein the first nodular layer is applied utilizing electrodeposition conditions of cathode current density of about 150–300 amps./ft.$^2$, an electrolyte temperature of about 80–110°F., a copper concentration in the electrolyte of about 20–30 grams per liter in terms of copper, an acid concentration in the electrolyte in terms of $H_2SO_4$ of about 50–100 grams per liter, and an electrodeposition time of about 10–14 seconds.

13. A method as defined in claim 1 wherein the application of the gilding layer causes substantially no decrease in bond strength supplied to the foil by the initial copper layer treatment; the amount of said nodular layer deposited being about 3–5 gms./m$^2$ of foil; the amount of said gilding layer deposited being about 3–7 gms./$m^2$ of foil; said zinc layer being electrodeposited on said matte surface in an amount of about 0.3–3 gms./$m^2$ of foil; said treated foil being washed prior to the application of said zinc coating sufficiently to remove the acid residue therefrom; said first nodular layer being applied utilizing electrodeposition conditions of cathode current density of about 150–300 amps./ft.$^2$, an electrolyte temperature of about 80°–110°F., a copper concentration in the electrolyte of about 20–30 grams per liter in terms of copper, an acid concentration in the electrolyte in terms of $H_2SO_4$ of about 50–100 grams per liter, and an electrodeposition time of about 10–14 seconds; said second gilding layer being applied utilizing electrodeposition conditions of cathode current density of about 100–300 amps./ft.$^2$, an electrolyte temperature of about 120°–160°F., a copper concentration in the electrolyte of about 50–100 grams per liter in terms of copper, an acid concentration in the electrolyte in terms of $H_2SO_4$ of about 50–100 grams per liter, an electrodeposition time of about 8–12 seconds; said zinc coating being applied utilizing electrodeposition conditions of cathode current density at about 5–300 amps./ft.$^2$, an electrolyte temperature of about 50°–150°F., a zinc concentration (calculated as $ZnSO_4 \cdot 7H_2O$) in the electrolyte of about 5–400 grams per liter, and an electrodeposition time of about 5–60 seconds, the pH of said electrolyte being about 1.5–6; said coated foil being heated following the application of said zinc coating at a temperature from about 250°F. to about 400°F. for about 30 minutes to about 10 hours so as to cause said zinc layer to alloy with said copper matte surface to form, at least partially, a brass layer.

14. Copper foil at least one surface of which has improved bond strength characteristics when bonded to a supporting substrate comprising: copper foil; a matte surface on said foil comprised of a nodular powdery copper electrodeposited layer which has been deposited from an acidic aqueous electrolyte separate from that used to form said copper foil, said electrolyte containing about 20–30 grams per liter of copper (calculated as Cu) at a cathode current density of about 150–300 amps./ft.$^2$; and a gilding copper electrodeposited layer atop said nodular layer which is not nodular in structure but which conforms to the nodular configuration of said powdery copper electrodeposit, said gilding layer having been deposited from an acidic aqueous electrolyte separate from that used to form said copper foil and said nodular layer, said electrolyte consisting essentially of about 50–100 grams per liter of copper (calculated as Cu) and sulfuric acid at a cathode current density of about 100–300 amps./ft.$^2$; said matte surface being covered with a zinc coating.

15. Copper foil as defined in claim 14 wherein the thickness of said zinc coating is such that it causes substantially no decrease in bond strength of said matte surface with respect to said substrate at the time it is bonded to said substrate.

16. Copper foil as defined in claim 14 wherein said zinc coating is alloyed with said copper matte surface to form, at least partially, a brass layer.

17. Copper foil as defined in claim 14 wherein the amount of said zinc coating deposited is about 0.3–3 gms./$m^2$ of foil.

18. Copper foil as defined in claim 14 wherein the amount of said nodular layer deposited is about 3–5 gms./$m^2$ of foil and of said gilded layer about 3–7 gms./$m^2$ of foil.

19. A laminate comprising the copper foil defined in claim 14 and a supporting substrate, the zinc alloy coated matte surface of said foil being bonded to said substrate.

20. Copper foil at least one surface of which has improved bond strength characteristics when bonded to a supporting substrate comprising: copper foil; a matte surface on said foil comprised of a nodular powdery copper electrodeposited layer which has been deposited from an acidic aqueous electrolyte separate from that used to form said copper foil, said electrolyte containing about 20–30 grams per liter of copper (calculated as Cu) at a cathode current density of about 150–300 amps./ft$^2$; and a gilding copper electrodeposited layer atop said nodular layer which is not nodular in structure but which conforms to the nodular configuration of said powdery copper electrodeposit, said gilding layer having been deposited from an acidic aqueous electrolyte separate from that used to form said copper foil and said nodular layer, said electrolyte consisting essentially of about 50–100 grams per liter of copper (calculated as Cu) and sulfuric acid at a cathode current density of about 100–300 amps./ft$^2$; said matte surface being covered with a brass coating.

21. Copper foil as defined in claim 20 wherein the thickness of said brass coating is such that it causes substantially no decrease in the bond strength of said matte surface with respect to said substrate at the time it is bonded to said substrate.

22. A method of treating copper foil comprising applying to the foil at least two separate electrodeposited copper treatment layers to form a matte surface, the first such layer in contact with said foil comprising a nodular powdery copper electrodeposit which has been deposited from an acidic aqueous electrolyte separate from that used to form said copper foil, said electrolyte containing about 20–30 grams per liter of copper (calculated as Cu) at a cathode current density of about 150–300 amps./ft$^2$; the second such layer comprising a gilding layer which is not nodular in structure but which conforms to the configuration of the first layer so as to reduce the powder transfer characteristics of said first layer, said second layer having been deposited from an acidic aqueous electrolyte separate from that used to form said copper foil and said nodular layer, said electrolyte consisting essentially of about 50–100 grams per liter of copper (calculated as Cu) and sulfuric acid at a cathode current density of about 100–300 amps./ft.$^2$; and coating said matte surface with a layer of a metal which will cause substantially no decrease in the bond strength of said matte surface so as to prevent laminate staining when said foil is bonded to a resinous substrate to form a printed circuit board with said metal in contact with said substrate.

23. A method as defined in claim 22 wherein said metal is nickel, cobalt, chromium, cadmium, tin or bronze.

24. Copper foil at least one surface of which has improved bond strength characteristics when bonded to a supporting substrate comprising: copper foil; a matte surface on said foil comprised of a nodular powdery copper elecrodeposited layer which has been deposited from an acidic aqueous electrolyte separate from that used to form said copper foil, said electrolyte containing about 20–30 grams per liter of copper (calculated as Cu) at a cathode current density of about 150–300 amps./ft.$^2$; and a gilding copper electrodeposited layer atop said nodular layer which is not nodular in structure but which conforms to the nodular configuration of said powdery copper electrodeposit, said gilding layer having been deposited from an acidic aqueous electrolyte separate from that used to form said copper foil and said nodular layer, said electrolyte consisting essentially of about 50–100 grams per liter of copper (calculated as Cu) and sulfuric acid, at a cathode current density of about 100–300 amps./ft.$^2$; said matte surface being covered with a metal which will cause substantially no decrease in the bond strength of said matte surface, and which is chemically inert to the metal forming said matte surface so as to prevent laminate staining when said foil is bonded to a resinous substrate to form a printed circuit board with said metal in contact with said substrate.

25. Copper foil as defined in claim 24 wherein said metal is nickel, cobalt, chromium, cadmium, tin or bronze.

26. A laminate comprising the copper foil defined in claim 24 and a supporting substrate, the metal coated matte surface of said foil being bonded to said substrate.

27. A method of treating copper foil comprising applying to the foil at least two separate electrodeposited copper treatment layers to form a matte surface, the first such layer in contact with said foil comprising a nodular powdery copper electrodeposit which has been deposited from an acidic aqueous electrolyte separate from that used to form said copper foil, said electrolyte containing about 20–30 grams per liter of copper (calculated as Cu) at a cathode current density of about 150–300 amps./ft$^2$; the second such layer comprising a gilding layer which is not nodular in structure but which conforms to the configuration of the first layer so as to reduce the powder transfer characteristics of said first layer, said second layer having been deposited from an acidic aqueous electrolyte separate from that used to form said copper foil and said first layer, said electrolyte consisting essentially of about 50–100 grams per liter of copper (calculated as Cu) and sulfuric acid at a cathode current density of about 100–300 amps./ft.$^2$; and coating said matte surface with a layer of brass having a thickness such that said brass layer causes substantially no decrease in the initial bond strength of said matte surface.

28. A method of treating copper foil comprising applying to the foil at least two separate electrodeposited copper treatment layers to form a matte surface, the first such layer in contact with said foil comprising a nodular powdery copper electrodeposit which has been deposited from an acidic aqueous electrolyte separate from that used to form said copper foil, said electrolyte containing sulfuric acid and about 20–30 grams per liter of copper (calculated as Cu) at a cathode current density of about 150–300 amps./ft$^2$; the second such layer comprising a gilding layer which is not nodular in structure but which conforms to the configuration of the first layer so as to reduce the powder transfer characteristics of said first layer, said second layer having been deposited from an acidic aqueous electrolyte separate from that used to form said copper foil and said first layer, said electrolyte consisting essentially of sulfuric acid and about 50–100 grams per liter of copper (calculated as Cu) at a cathode density of about 100–300 amps./ft$^2$; and coating said matte surface with a layer of zinc.

29. A method of treating copper foil comprising applying to the foil at least two separate electrodeposited copper treatment layers to form a matte surface, the first of such layers in contact with said foil comprising a nodular, powdery copper electrodeposit which has been deposited from a first acidic aqueous electrolyte separate from that used to form said copper foil, said first electrolyte containing about 20–30 grams per liter of copper (calculated as Cu), about 50–100 grams per liter of $H_2SO_4$, at a cathode current density of about 150–300 amps./ft$^2$, for an electrodeposition time of about 10–14 seconds, said electrolyte being maintained at a temperature of about 80°–110°F; the second such layer comprising a gilding layer which is not nodular in structure but which conforms to the configuration of the first layer so as to reduce the powder transfer characteristics of said first layer, said second layer having been deposited from a second acidic aqueous electrolyte different from that used to form said copper foil and said first layer, said second electrolyte consisting essentially of 50–100 grams per liter of copper (calculated as Cu) and about 50–100 grams per liter of $H_2SO_4$, at a cathode current density of about 100–300 amps./ft$^2$ for an electrodeposition time of about 8–12 seconds, said electrolyte being maintained at a temperature of about 120°–160°F; and coating said matte surface with a layer of zinc.

* * * * *